United States Patent
Liu et al.

(10) Patent No.: US 9,501,288 B2
(45) Date of Patent: Nov. 22, 2016

(54) POWER-ON METHOD AND RELATED SERVER DEVICE BASED ON A BLADE ENABLE SIGNAL ASSERTED BY A CHASSIS MANAGEMENT MODULE

(71) Applicant: Wistron Corporation, New Taipei (TW)

(72) Inventors: Yu-Hung Liu, New Taipei (TW); Cheng-Kuang Hsieh, New Taipei (TW); Chia-Ming Tsai, New Taipei (TW); Yuan-Hao Peng, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 14/601,245

(22) Filed: Jan. 21, 2015

(65) Prior Publication Data

US 2016/0124750 A1    May 5, 2016

(30) Foreign Application Priority Data

Oct. 30, 2014 (TW) .............................. 103137685 A

(51) Int. Cl.
*G06F 9/00* (2006.01)
*G06F 1/00* (2006.01)
*G06F 15/16* (2006.01)
*G06F 9/44* (2006.01)
*G06F 1/26* (2006.01)

(52) U.S. Cl.
CPC ............. *G06F 9/4401* (2013.01); *G06F 1/263* (2013.01)

(58) Field of Classification Search
CPC ...................................................... G06F 9/4401
USPC .............................................................. 713/2
See application file for complete search history.

(56) References Cited

U.S. PATENT DOCUMENTS

| 7,325,149 | B2* | 1/2008 | Liu ........................ G06F 1/3209 709/227 |
| 7,802,017 | B2* | 9/2010 | Uemura .................. G06F 1/189 370/252 |
| 8,868,865 | B1* | 10/2014 | Kondoh .................. G06F 13/28 711/100 |
| 2006/0136703 | A1* | 6/2006 | Wisecup ............... G06F 9/4416 713/2 |

* cited by examiner

*Primary Examiner* — Suresh Suryawanshi
(74) *Attorney, Agent, or Firm* — Winston Hsu; Scott Margo

(57) ABSTRACT

A power-on method for a server device includes generating a stand-by power to a server module of the server device when a blade enable signal is asserted; asserting, by the server module, a power-on signal to a storage module of the server device; performing, by the storage module, a first boot-on process when the storage module receives the asserted power-on signal; transmitting, by the storage module, an asserted ready signal to the server module when the first boot-on process finishes; and performing, by the server module, a second boot-on process via a normal power when the server module receives the asserted ready signal.

8 Claims, 3 Drawing Sheets

POWER-ON METHOD AND RELATED SERVER DEVICE BASED ON A BLADE ENABLE SIGNAL ASSERTED BY A CHASSIS MANAGEMENT MODULE

BACKGROUND OF THE INVENTION

1. Field of the Invention

The present invention relates to a power-on method and related server device, and more particularly, to a power-on method capable of ensuring a server normally boots on and related server device.

2. Description of the Prior Art

In recent years, cloud computing rapid rises, which allows various kinds of cloud services and cloud applications to be implemented in the daily life. Since the number of users and that of services are continuously growing, the companies in the industry built large-scale data centers in succession. In order to economize the room space, the large-scale data centers may adopt storage servers to realize the server system.

As the name suggest, the storage server is the server realized by configuring the server and the storage device (e.g. a hard disk drive array) in a chassis. When the storage server boots up, the server and the storage device would simultaneously perform boot-on processes since the server and the storage device use the same power. In such a condition, the storage device may have not finished the boot-on process when the server is required to access data from the storage device, resulting the server operates abnormally. Thus, how to ensure the server normally booting on becomes a topic to be discussed.

SUMMARY OF THE INVENTION

In order to solve the above problem, the present invention provides a power-on method capable of ensuring a server normally booting on and related server device.

In an aspect, the present invention discloses a power-on method for a server device. The power-on method comprises generating a stand-by power to a server module of the server device when a blade enable signal is asserted; asserting, by the server module, a power-on signal to a storage module of the server device; performing, by the storage module, a first boot-on process when the storage module receives the asserted power-on signal; transmitting, by the storage module, an asserted ready signal to the server module when the first boot-on process finishes; and performing, by the server module, a second boot-on process via a normal power when the server module receives the asserted ready signal.

In another aspect, the present invention further discloses server device. The server device comprises a power management module, for generating a stand-by power when receiving an asserted blade enable signal; a server module, for asserting a power-on signal when receiving the stand-by power; and a storage module, for performing a first boot-on process when receiving the asserted power-on signal and asserting a ready signal when the first boot-on process finishes; wherein the server module performs a second boot-on process via a normal power when receiving the asserted ready signal These and other objectives of the present invention will no doubt become obvious to those of ordinary skill in the art after reading the following detailed description of the preferred embodiment that is illustrated in the various figures and drawings.

DETAILED DESCRIPTION

Figure 1:
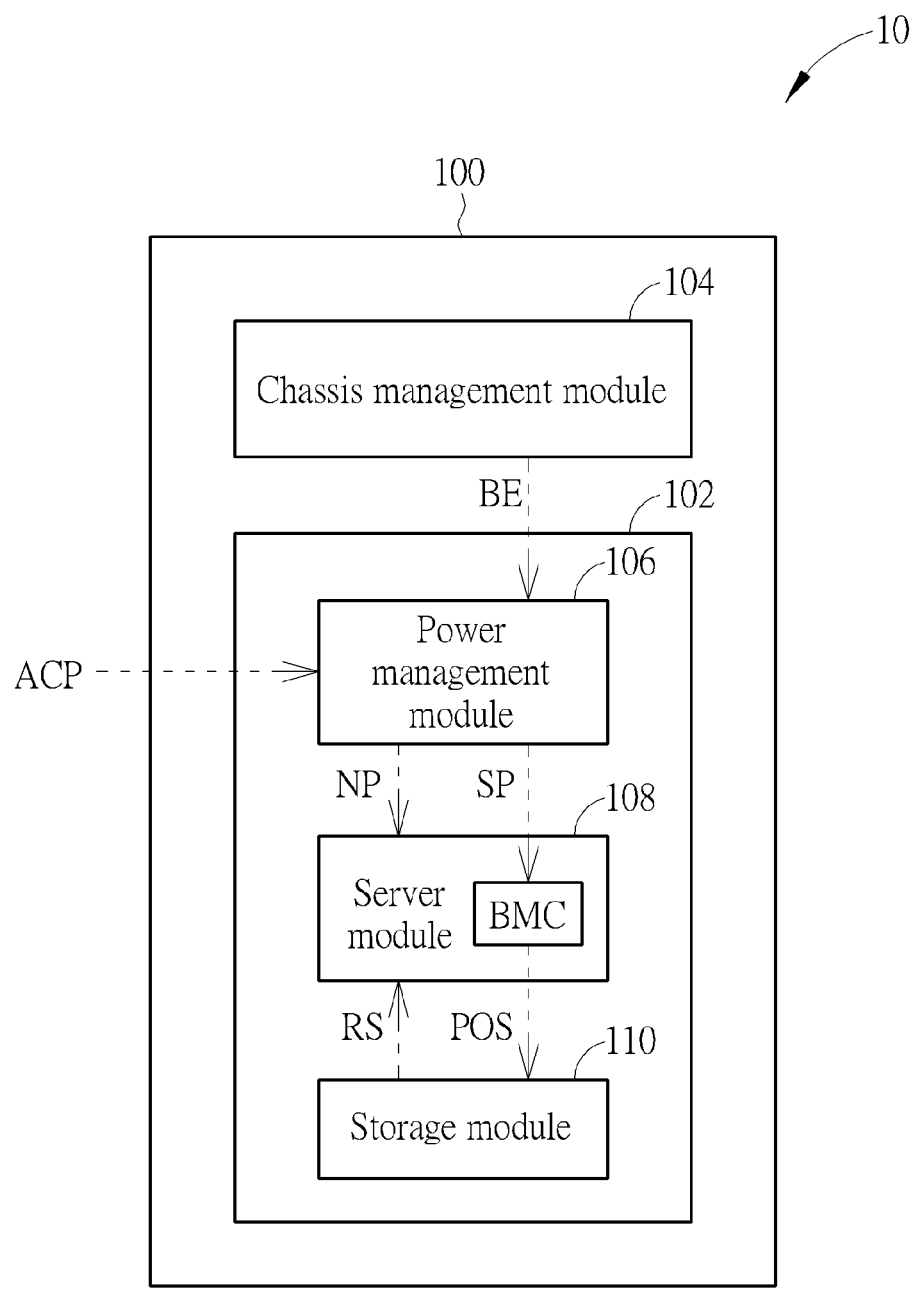
FIG. 1 is a schematic diagram of a server system according to an embodiment of the present invention.

Please refer to FIG. 1, which is a schematic diagram of a server system 10 according to an embodiment of the present invention. As shown in FIG. 1, the server system 10 comprises a chassis 100 and a server device 102, wherein the chassis comprises a chassis management module 104. The server device 102 is configured in the chassis 100 and comprises a power management module 106, a server module 108 and a storage module 110. In an embodiment, the server device 102 may be a storage server, a computing server or a network server, and is not limited herein. When the user requires to boots on the server device 102, the chassis management module 104 generates a blade enable signal BE to control the power management module 106 to generate a stand-by power SP to the server module 108. After the server module 108 receives the stand-by power SP, the server module 108 generates a power-on signal POS to the storage module 110, for controlling the storage module 110 to perform a boot-on process. Next, the storage module 110 feedbacks a ready signal RS to the server module 108 when finishing the boot-on process. Till receiving the ready signal RS, the server module 108 begins to perform a boot-on process according to a normal power NP generated by the power management module 106. As a result, the server device 102 avoids the server module 108 works abnormally due to the accessibility of the storage module 110.

In details, the power management module 106, the server module 108 and storage module 110 may be configured in the same server device (e.g. the server device 102). When an external power ACP couples to the chassis 100, the chassis management module 104 is turned on and the power management module 106 also connects to and receives the external power ACP. If the user is required to boot on the server device 102, the power management module 106 would receive the blade enable signal BE from the chassis management module 104 and generates the stand-by power SP to the server module 108. In such a condition, part of the components in the server module 108 are turned on when receiving the stand-by power SP and generate the power-on signal POS to the storage module 110. In this embodiment, only a Baseboard Management Controller (BMC) is turned on to generate the power-on signal POS and rest of the components in the server module 108 keep shutting down (e.g. rest of the components in the server module 108 remain in the S5 mode defined in the Advanced Configuration and Power Interface (ACPI)) after receiving the stand-by power SP. In addition, the power management module 106 determines receiving the blade enable signal BE according to whether the blade enable signal BE is asserted. When the blade enable signal BE is asserted, the power management module 106 determines receiving the blade enable signal BE; and when the blade enable signal is de-asserted, the power management module 106 determines not receiving the blade enable signal BE.

After receiving the power-on signal POS, the storage module 110 perform the boot-on process. Similar to the power management module 106, the storage module 110 determines whether receiving the power-on signal POS according to whether the power-on signal POS is asserted. When finishing the boot-on process, the storage module 110 generates the asserted ready signal RS to the server module 108, to indicate the server module 108 that the boot-on process of the storage module 110 completes. When receiving the asserted ready signal RS, the BMC of the server module 108 controls the server module 108 to perform the boot-on process via the normal power NP generated by the power management module 106, to turn on rest of the components in the server module 108. That is, the storage module 110 has been turned on and accessible when the server module 108 performs the boot-on process, so as to avoid the situation that the server module 108 cannot access the storage module 110. Via adjusting the operations performed by the BMC of the server module 108 after receiving the stand-by power SP, the server system 10 does not require additional hardware device to achieve the goal of avoiding the server device 102 works abnormally.

Further, the user may de-assert the blade enable signal BE via the chassis management module 104 when the server device 102 crashes and the user needs to re-boot the server device 102, to make the power management module 106 stop generating the stand-by power SP and the normal power NP. In such a condition, all of the components (including the BMC) in the server module 108 lose power and stop operating, resulting that the storage module 110 also stops operating and enters the power-off mode. Next, the user asserts the blade enable signal BE for controlling the server device 102 perform the abovementioned boot-on process. In other words, the user can use only a control signal (i.e. the blade enable signal BE) to remotely re-boot the server device 102 via the chassis management module 104.

According to different application and design concepts, those with ordinary skill in the art may observe appropriate alternations and modifications. For example, the chassis 100 of the server system 10 shown in FIG. 1 may comprise a plurality of server devices 102 and the user may control the operation states of the plurality of server devices 102 via different blade enable signals.

Figure 2:
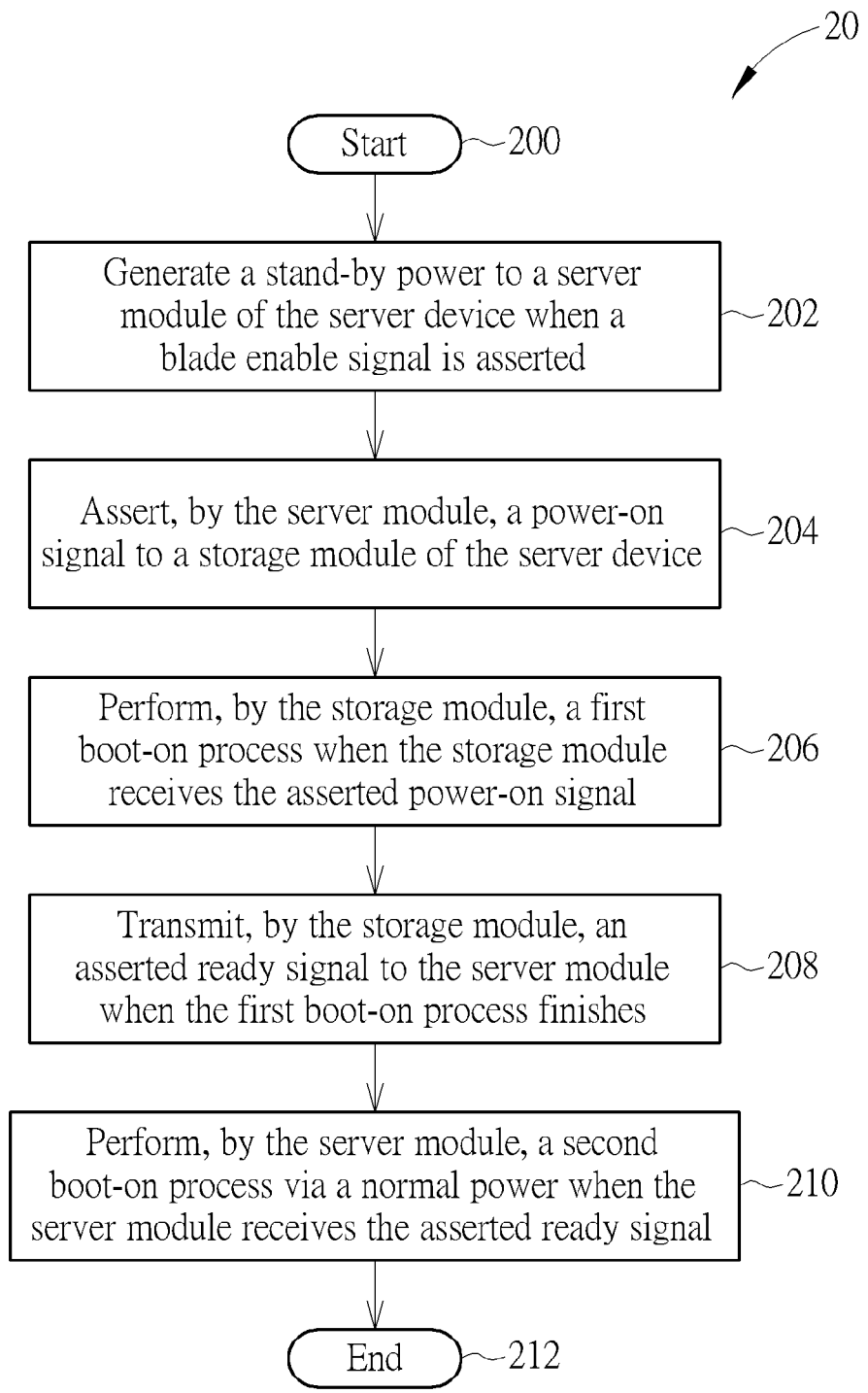
FIG. 2 is a flowchart of a process according to an embodiment of the present invention.

The process of the server device 102 boots on in the above embodiment can be summarized into a process 20 as shown in FIG. 2. The process 20 can be utilized in a server device, such as a storage server, a computing server or a network server, and comprises the following steps:

Step 200: Start.

Step 202: Generate a stand-by power to a server module of the server device when a blade enable signal is asserted.

Step 204: Assert, by the server module, a power-on signal to a storage module of the server device.

Step 206: Perform, by the storage module, a first boot-on process when the storage module receives the asserted power-on signal.

Step 208: Transmit, by the storage module, an asserted ready signal to the server module when the first boot-on process finishes.

Step 210: Perform, by the server module, a second boot-on process via a normal power when the server module receives the asserted ready signal.

Step 212: End.

According to the process 20, the server device generates a stand-by power to a server module of the server device via a power management module of the server device when receiving the blade enable signal. In this example, the power management determines receiving the blade enable signal when the blade enable signal is asserted; and determines not receiving the blade enable signal when the blade enable signal is de-asserted. For example, the blade enable signal is asserted when being adjusted to a high logic level '1'; and the blade enable signal is de-asserted when being adjusted to a low logic level '0'. After receiving the stand-by power, part of the components in the server module (e.g. the BMC) are turned on and generate a power-on signal (e.g. assert the power-on signal) to a storage module of the server device, to control the storage module to perform a first boot-on process. Note that, rest of the components in the server module (e.g. the components in the server module except the BMC) keep in the power-off mode. When the storage module finishes the first boot-on process, the storage module transmits a ready signal to the server module. The storage module performs a second boot-on process when receiving the ready signal (e.g. when determining the ready signal is asserted), to turn on all of the components in the server module. In other words, the storage module has finished the first boot-on process and has been accessible when the server module performs the second boot-on process. The server device therefore can guarantee that the server module works normally. The detailed operations of the process 20 can be referred to the above, and are not narrated herein for brevity.

Figure 3:
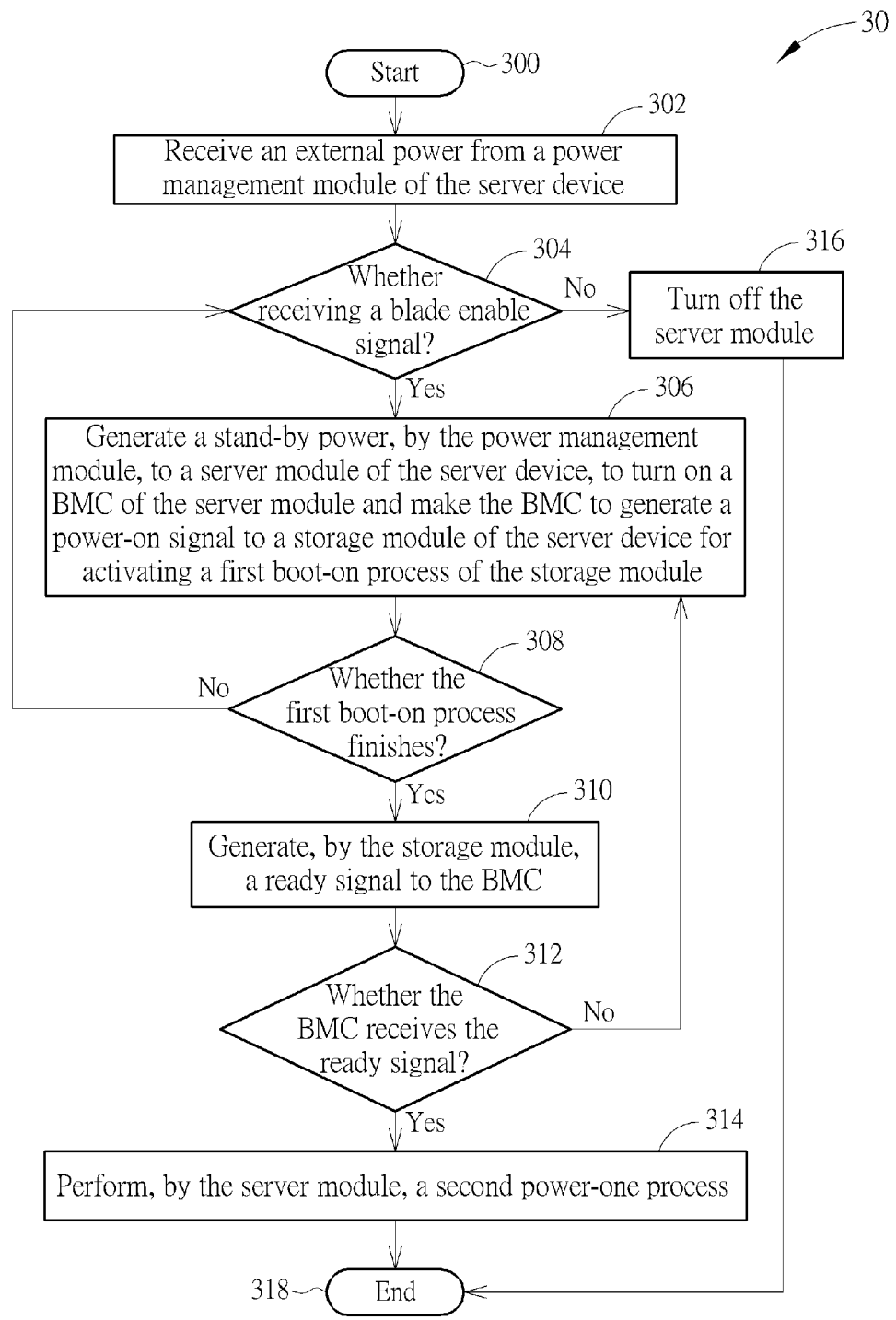
FIG. 3 is a flowchart of a realization of the process shown in FIG. 2.

Please refer to FIG. 3, which is a flowchart of a realization of the process 20 shown in FIG. 2. The process 30 shown in FIG. 3 can be utilized in a sever device, such as a storage server, a computing server or a network server, and comprises the following steps:

Step 300: Start.

Step 302: Receive an external power from a power management module of the server device.

Step 304: Determine whether receiving a blade enable signal, if yes, perform step 306; otherwise, perform step 316.

Step 306: Generate a stand-by power, by the power management module, to a server module of the server device, to turn on a baseboard management controller (BMC) of the server module and make the BMC to generate a power-on signal to a storage module of the server device for activating a first boot-on process of the storage module.

Step 308: Determine whether the first boot-on process finishes, if yes, perform step 310; otherwise, perform step 304.

Step 310: Generate, by the storage module, a ready signal to the BMC.

Step 312: Detect whether the BMC receives the ready signal, if yes, perform step 314; otherwise, perform step 306.

Step 314: Perform, by the server module, a second power-one process.

Step 316: Turn off the server module.

Step 318: End.

According to the process 30, a power management module of the server device determines whether receiving an external blade enable signal when an external power couples to the power management module. In an example, the power management determines receiving the blade enable signal when the blade enable signal is asserted; and determines not receiving the blade enable signal when the blade enable signal is de-asserted (step 304). When the power management module determines receiving the blade enable signal (e.g. the blade enable signal is adjusted to the high logic level '1'), the power management module generates a stand-by power to a server module of the server device, to turn on a baseboard management controller (BMC) in the server module. In such a condition, rest of the components in the server module keep shutting down (e.g. remain in the S5 mode defined in the ACPI) and the BMC generates a power-on signal to a storage module of the server device, to control the storage module to perform a first boot-on process (step 306). Next, the power management module keeps detecting whether receiving the blade enable signal (e.g. detecting the logic level of the blade enable signal) when the storage module has not finished the first boot-on process (steps 308 and 304). When the storage module finishes the first boot-on process, the storage module transmits a ready signal to the BMC of the server module and the BMC controls the server module to perform a second boot-on process, to turn on rest of the components in the server module via a normal power generated by the power management module (steps 312 and 314).

On the other hand, if the power management module determines not receiving the blade enable signal (e.g. the blade enable signal is at the low logic level '0') in step 302, the power management module stops outputting all of the powers (e.g. the stand-by power and the normal power) to the server module, to make the server module enter the power-off mode.

To sum up, the above embodiment use the standby power to turn on part of the components in the server module of the server device when booting on the server device, for controlling the storage module of the server device to perform the boot-on process when most of the components in the server module remain shutting down. Till the storage module finishes the boot-on process and feedbacks the ready signal, the server module performs the boot-on process. As a result, the server device avoids the server module works abnormally due to the accessibility of the storage module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-on method for a server device, the power-on method comprising:
   generating a stand-by power to a server module of the server device when a blade enable signal is asserted by a chassis management module of the server device;
   asserting, by the server module, a power-on signal to a storage module of the server device;
   performing, by the storage module, a first boot-on process when the storage module receives the asserted power-on signal;
   transmitting, by the storage module, an asserted ready signal to the server module when the first boot-on process finishes; and
   performing, by the server module, a second boot-on process via a normal power when the server module receives the asserted ready signal;
   wherein the stand-by power and the normal power are generated by a power management module of the server device when the power management module receives the asserted blade enable signal.

2. The power-on method of claim 1, wherein the stand-by power boots on a baseboard management controller of the server module and other components of the server module keep shutting down.

3. The power-on method of claim 1, wherein the server module and the storage module are configured in the same server device.

4. The power-on method of claim 1, further comprising:
   de-asserting the blade enable signal, for turning off the stand-by power and the normal power;
   de-asserting, by the server module, the power-on signal, for turning off the storage module; and
   asserting the blade enable signal.

5. A server device, comprising:
   a chassis management module;
   a power management module, for generating a stand-by power and a normal power when receiving a blade enable signal asserted by the chassis management module;
   a server module, for asserting a power-on signal when receiving the stand-by power; and
   a storage module, for performing a first boot-on process when receiving the asserted power-on signal and asserting a ready signal when the first boot-on process finishes;
   wherein the server module performs a second boot-on process via the normal power when receiving the asserted ready signal.

6. The server device of claim 5, wherein the server module comprises a baseboard management controller for asserting the power-on signal when receiving the stand-by power and other components of the server module keep shutting down.

7. The server device of claim 5, wherein the server module and the storage module are configured in the same server device.

8. The server device of claim 5, wherein the stand-by power and the normal power are turned off when the blade enable signal is disabled.

* * * * *